Sept. 17, 1957 C. E. SLAUGHTER 2,806,528
CONVEYOR METHODS AND MACHINE IN CONTAINER MANUFACTURE
Original Filed Sept. 4, 1947 10 Sheets-Sheet 1

FIG. 1

INVENTOR
Charles E. Slaughter
BY
Sol Shapiro
ATTORNEY

Sept. 17, 1957     C. E. SLAUGHTER     2,806,528
CONVEYOR METHODS AND MACHINE IN CONTAINER MANUFACTURE Original Filed Sept. 4, 1947     10 Sheets-Sheet 5

INVENTOR.
Charles E. Slaughter
BY
Sol Shappirio
ATTORNEY.

Sept. 17, 1957 C. E. SLAUGHTER 2,806,528
CONVEYOR METHODS AND MACHINE IN CONTAINER MANUFACTURE
Original Filed Sept. 4, 1947 10 Sheets-Sheet 6

INVENTOR.
Charles E. Slaughter
BY
Sol Shapiro.
ATTORNEY.

FIG. 7

Sept. 17, 1957 C. E. SLAUGHTER 2,806,528
CONVEYOR METHODS AND MACHINE IN CONTAINER MANUFACTURE
Original Filed Sept. 4, 1947 10 Sheets-Sheet 10

INVENTOR.
Charles E. Slaughter
BY
Sol Shappirio
ATTORNEY.

с

United States Patent Office 2,806,528
Patented Sept. 17, 1957

2,806,528

CONVEYOR METHODS AND MACHINE IN CONTAINER MANUFACTURE

Charles E. Slaughter, New Canaan, Conn., assignor to Extruded Plastics, Inc., a corporation of Connecticut Original application September 4, 1947, Serial No. 772,095, now Patent No. 2,661,790, dated December 8, 1953. Divided and this application December 4, 1953, Serial No. 396,257

6 Claims. (Cl. 164—17)

This invention relates to methods and machines for making tubular containers and particularly for the production of containers from tubes or tubing specifically plastic tubes or tubing, including conveyor methods and machines for handling the tubes in such operations.

This application is a division of application Serial No. 772,095, filed September 4, 1947, which has matured into Patent No. 2,661,790.

Prior art methods of producing containers from plastic materials have not been able to compete successfully in many fields, despite the evident disadvantages of glass due to its fragile nature, because of several reasons. Among those reasons one has been cost of manufacture resulting from the requirement of manual operations at many stages of the procedure. Another reason has been because those manual operations do not produce finished containers of good workmanship-like character. The closures in such containers do not fit properly, solvents and cements applied for sealing the closures in position mar the surfaces of the plastic and a satisfactory appearing article is not produced as a routine matter of production, there being many rejects.

Among the objects of the present invention is the production of containers from plastics in which continuous operations are carried out resulting in the economical production of containers in great numbers on large scale operations.

Further objects include continuous automatic operations resulting in high rates of production of plastic containers.

Still further objects include the production of such containers from plastics eliminating any manual operations whatsoever.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In connection with that more detailed description, there is shown in the accompanying drawings, the following.

In accordance with the present invention conveyor methods and means are particularly emphasized for use with or in methods and machines wherein tubular containers are produced from plastic tubing and tubes although the invention is applicable to the production of containers from various other materials including metals, in at least many of the operations set forth below. The invention will be illustrated particularly in connection with the production of containers from plastics and more particularly from thermoplastic materials.

In accordance with the invention tubular containers are manufactured continuously preferably starting with continuous tubing made on an extrusion machine from thermoplastic material. Such tubing as it is being continuously extruded and after it has reached rigidity is subjected to a shearing operation to cut off from such continuous tubing, tubes of a length for the particular container to be manufactured. The shearing operations for producing the tube lengths from the continuous tubing, are carried out continuously so that the tubes for producing the containers are constantly supplied from such shearing operation.

Instead of producing the tubes by shearing operations in this way, the tubes for the manufacture of the containers may be obtained from any other source. As noted above, where the tubes for the containers are produced from extruded stock they will in general be made from a thermoplastic material. Any of the thermoplastic materials utilized in producing extruded tubular stock may be employed for these purposes, and particularly synthetic resinous material may be used including for example, cellulose derivatives such as the esters and ethers, particularly cellulose acetate, cellulose nitrate, cellulose acetate butyrate, ethyl cellulose, benzyl cellulose, etc.; vinyl polymers and copolymers including polymerized vinyl acetate, polymerized vinylidene chloride, and copolymers of vinyl chloride and vinyl acetate; polymerized styrene; methacrylate and methyl methacrylate resins; acrylate and ethyl acrylate resins; polyethylenes; nylon type resins; etc. Where the tubes are made from plastic stock which is not extruded, the materials may be of the character set forth above or any of the thermosetting resins used for making tubular stock may be employed. And as pointed out above, for some purposes many of the operations herein set forth may be carried out on tubes made from other than plastics such as metal, paper or cardboard, etc.

The cross-sectional contour of the tubing or tubes employed may be varied as desired and may take any configuration such as circular, oval, square, hexagonal, or otherwise polygonal, etc., and containers may be produced from any stock of any configuration desired. The plastic materials lend themselves to the use of color and colored stock of any desired character may be employed whether dyed, pigmented, striated, etc.

The tubes thus obtained in any desired way as set forth above, are continuously conveyed to what may be called the sealing station where the tubes continuously pass through a series of stations at which the operations for introducing the closure and sealing the closure in position are carried out. The tubes may be conveyed from the conveyor to the sealing station either as individual tubes operated on successively in such sealing station, or a group of tubes such as two or more tubes may be simultaneously fed side by side to the sealing station and the sealing operation carried out on such group of tubes simultaneously. Operations in this way increase the capacity and rate of production of containers. Desirably the conveyor movement is synchronized with the movement of the tubes through the sealing station to make for automatic operation in which the tube or tubes are continuously fed to and through the sealing station where the sealing operations are carried out.

The conveying of the tubes is important and in general the following system is desirably employed. The tubes after being formed at the shearing station are positioned on a conveyor desirably horizontal where they are maintained in spaced alinement as the conveyor is advanced usually by step-by-step movement. Since they are to be delivered to a station where an operation is to be performed on the tubes while in vertical position, means are provided to invert the tubes from horizontal position to vertical position before delivery to the operation station. In addition, it is desirable as indicated herein to operate on a number of tubes simultaneously as for example at least two in order to increase machine capacity. Hence the tubes are maintained on the conveyors in alined separation and delivery means utilized to deliver two or more tubes in a group in alined separation. For example a rotatable roller which contacts with the number of tubes to be removed from the conveyor, may be used for this purpose.

Many features of the operation including both steps employed and the machinery involved will appear from the description of the detailed apparatus and operations as set forth below describing in detail the mechanism and operations of the device as shown in the drawings.

Figure 17:
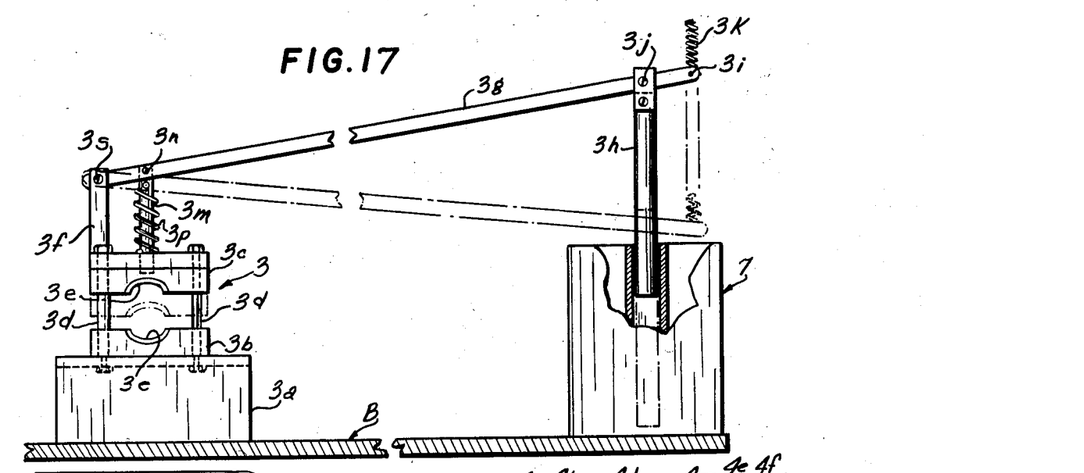
Figure 17 is a side elevation on line 17—17 of Figure 3 showing the means for operating the vise to lock the tubing during the shearing operation.

Considering first the mechanism utilized in producing container-length tubes from continuous tubing and referring particularly to Figures 1–4 of the drawings, the continuous length of tubing T as taken from the extruding machine (not shown) in a continuously extruded length and in its final self-sustaining condition is drawn by rollers 1 (Figure 1) through the guide or bridge 2 (Figures 3 and 10) mounted on base B. The guide or bridge 2 may consist of vertical side members 2a having cross pieces 2b and 2c, the latter serving as a ledge over which the tubing T is carried. Ears 2d on the side members 2a enable the guide or bridge 2 to be attached as by screws 2e to the base B. The continuous length of tubing is carried forward from the guide or bridge 2 through a chuck or vise 3 while the latter is in unlocked condition (Figures 2, 3 and 17) and then through cutter block 4 past knockout arm 12 until it meets and engages contact arm 5, whereupon further movement brings the contact arm 5 into electrical contact with micro switch 6. The closing of switch 6 closes a circuit which energizes solenoid 7 which then locks the vise or chuck 3. The vise or chuck 3 (Figure 17) is carried on a support 3a and consists of a lower stationary jaw 3b and an upper reciprocating jaw 3c mounted on guides 3d. Each jaw is provided with a shaped face 3e conforming with the shape of the continuous tubing being manipulated, in this case oval tubing, so that each jaw is provided with a semi-oval face. A standard 3f mounted on the support 3a carries an actuating arm 3g pivoted at one of its ends as shown at 3s to the standard 3f. Near the opposite end of the actuating arm 3g, the armature 3h is mounted as at 3j and said armature 3h is drawn downwardly when the solenoid 7 is energized. A spring 3k mounted at the outer end 3i of the actuating arm 3g and attached at its other end to any support (not shown) is extended when the armature 3h is drawn downwardly by the solenoid 7 when the latter is energized and when the solenoid is deenergized the spring 3k under tension draws the actuating arm 3g back to its normal position. A link 3m is attached to the actuating arm 3g as at 3n directly over the movable upper jaw 3c of the vise or chuck 3, and the link 3m is attached at its lower end to such movable upper jaw member 3c. A spring 3p surrounds the link 3m and is seated at one end against the actuating arm 3g and at the other end against the movable upper jaw member 3c.

The contact arm 5 (Figures 3, 11 and 12) has an extension 5a pivotally mounted at 5b on the upright 5c carried on the support 5d, the latter being attached to the base B. A spring 5e is attached at the outer end of the extension 5a while the other end of the spring 5e is attached to the pin 5f carried on the uprights 5c.

Figures 11, 12, 13, 14, 15, 16:
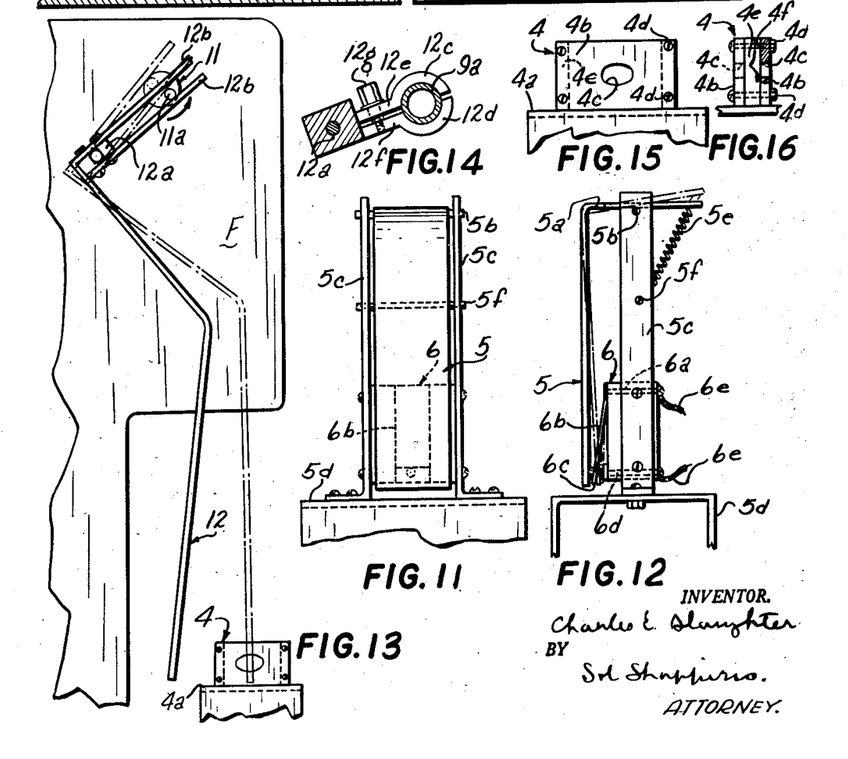
Figure 11 is a detail on line 11—11 of Figure 3 showing the switch mechanism for operating the solenoids that control the vise for locking the tubing and the shearing means.
Figure 12 is a side elevation of Figure 11.
Figure 13 is a side elevation on line 13—13 of Figure 3 showing the knockout mechanism for the sheared tubes.
Figure 14 is a fragmentary detail on line 14—14 of Figure 3 of the provision for adjustment of the knockout means.
Figure 15 is a fragmentary detail on line 15—15 of Figure 3 showing an elevation of the cutter block.
Figure 16 is a side view of Figure 15.

The switch 5 includes a contact element 6a and on the outer end of the contact element 6a a spring contact element 6b is mounted, the outer end 6c of which engages against a projection on the lower end of the contact arm 5. A lower contact element 6d also carried on the upright 5c is adapted to contact with the spring contact element 6b when the latter is moved by contact arm 5. Electrical connections are made to the contact elements 6a and 6d as shown at 6e.

Figure 1:
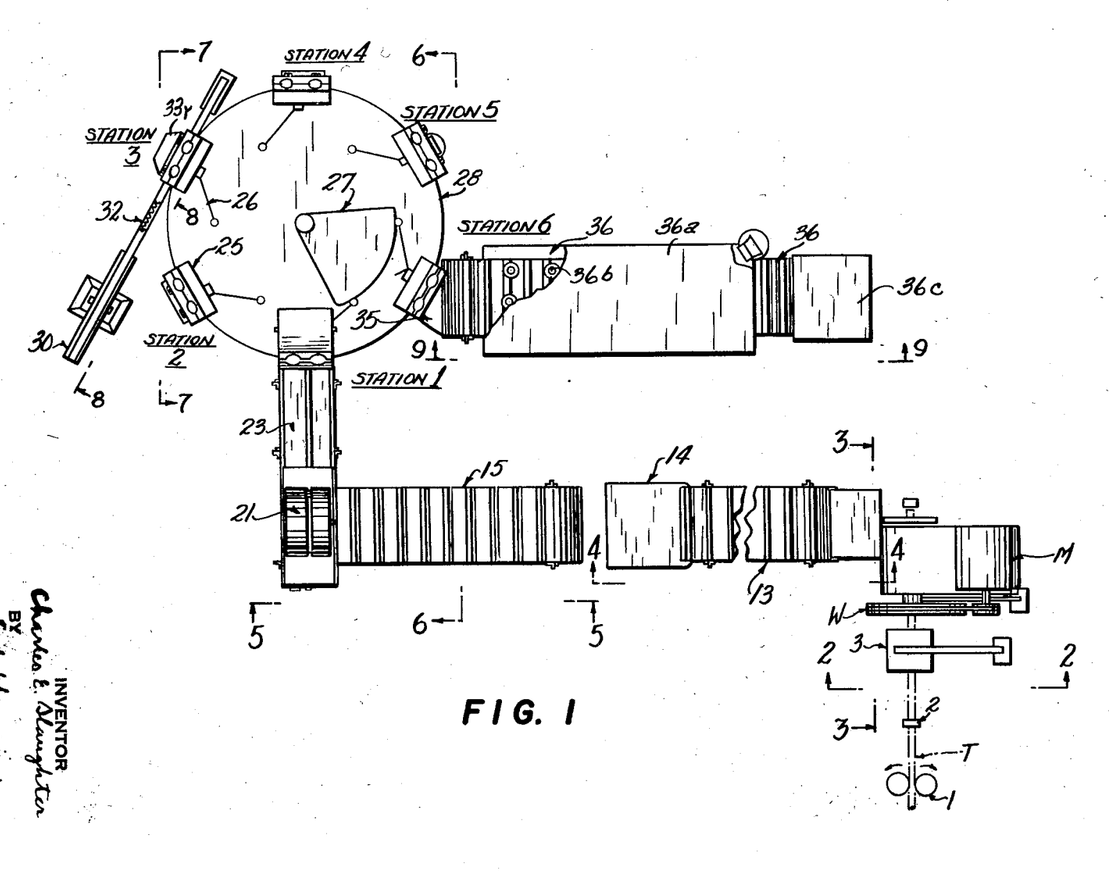
Figure 1 is a top plan diagrammatic view of all of the associated mechanism showing the general layout.
Figures 2, 2A, 8, 9:
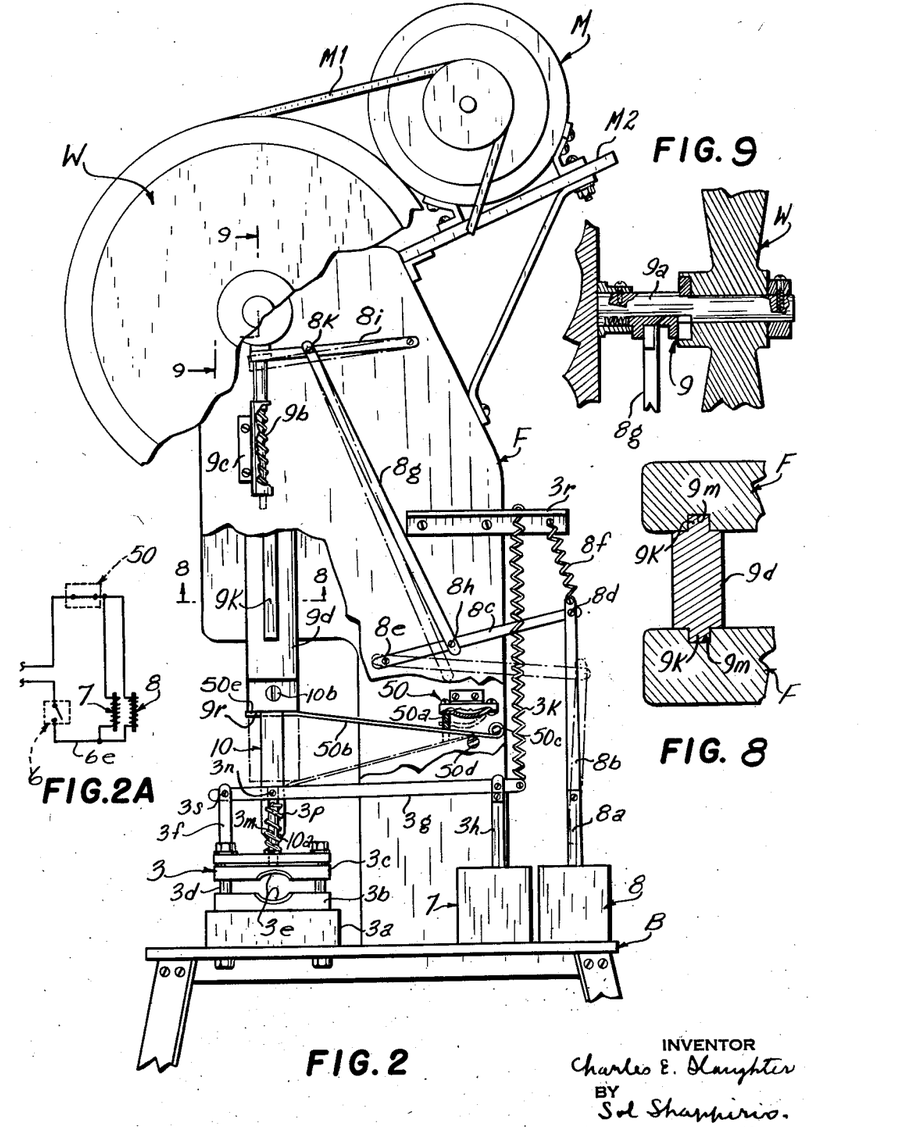
Figure 2 is a side elevation on line 2—2 of Figure 1 showing the vise operating and knife operating mechanisms.
Figure 2A is a detail showing the circuit utilized in controlling the tube locking vise and the shearing means.
Figure 8 is a fragmentary sectional detail on line 8—8 of Figure 2.
Figure 9 is a fragmentary sectional detail on line 9—9 of Figure 2.
Figures 3, 10:
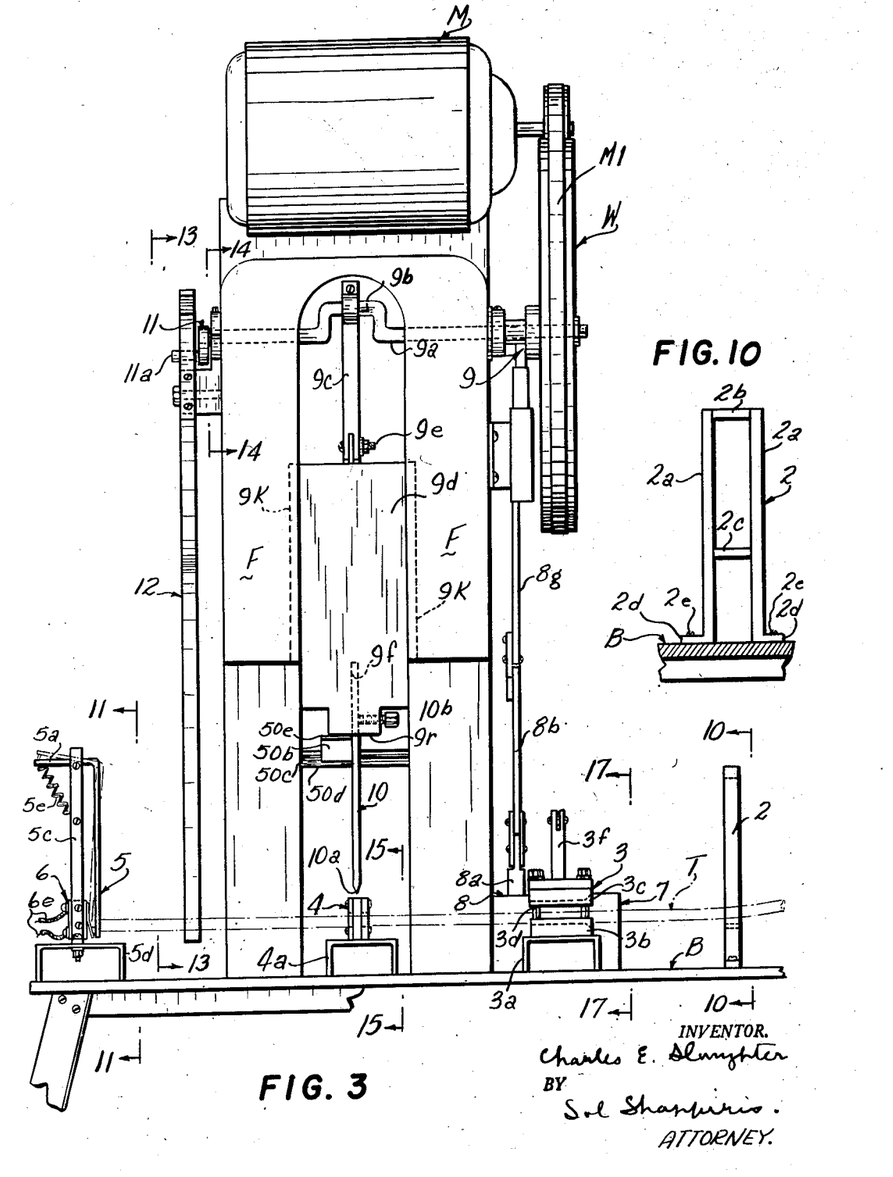
Figure 3 is an elevation on line 3—3 of Figure 1 showing the mechanism for shearing tube lengths from the continuous tubing.
Figure 10 is a fragmentary detail on line 10—10 of Figure 3; showing the guide for the continuous tubing.

When the contact arm 5 closes the switch 6 in addition to energizing solenoid 7, it simultaneously energizes a second solenoid 8 (Figures 2, 2A). The solenoid 8 controls the shearing mechanism for cutting the tubing. The armature 8a (Figure 2) is pivotally connected to link 8b, the other end of the link 8b being pivotally connected to lever 8c at 8d. The other end of the lever 8c is pivotally mounted at 8e on the frame F. A spring 8f is attached at one end of the lever 8c and at the other end to the bracket 3r on the frame F. A link 8g pivotally mounted at 8h intermediate the ends of the lever 8c is pivotally connected at its other end 8k to the clutch operating lever 8i.

The lever 8i operates the clutch 9 (Figure 9) to engage the latter and transmit power from the flywheel W through the shaft 9a to the knife operating mechanism. A spring 9b mounted on bracket 9c carried on frame F forces disengagement of the clutch 9 to disengage the knife operating mechanism. The flywheel W is rotated by motor M (Figure 2) through belt M1, the motor being mounted on shelf M2 supported on the frame F.

The cutting or shearing mechanism includes the cutter block 4 (Figures 3, 15, 16) carried on a support 4a mounted on the base B. The cutter block is shown as composed of plates 4b having centrally aligned openings 4c of a contour corresponding with the cross-section of the tubing being sheared, the plates 4b, 4b, being separated from each other by bolts 4d and two spacers 4e, providing a space 4f within which the cutter blade 10 operates.

The shaft 9a (Figure 3) carries a cam 9b on which a link 9c is carried. On the other end of said link 9c, the knife chuck 9d is provided mounted on the link 9c by the bolt 9e. A slot 9f is provided in the lower end of the knife chuck 9d for reception of the knife 10 which may be as shown a flat blade having the knife edge 10a. A set screw 10b fixes the knife 10 in set position. Oppositely disposed keys 9k on chuck 9d cooperate with keyways 9m in the frame thus insuring constant true alignment of knife blade 10 with the space 4f in cutter block 4 (see Figure 8). Operation of the shaft 9a thus causes reciprocation of the knife blade 10 to and out of the cutter space 4f in the cutter block 4 with each revolution of the flywheel W.

A second switch 50 (Figure 2) which is provided to eliminate the possibility of double cuts, operates as follows: the micro switch 50 is closed by a projection 50a on spring arm 50b. Said arm 50b made of any springy material, is pivotally attached as at 50c and flexes over a bar 50d. The outer end 50e of arm 50b abuts the bottom 9r of the knife chuck 9d and lies adjacent to the knife blade 10. The arm 50b will, therefore, be in constant abutment with the bottom 9r of chuck 9d being forced downwardly by the chuck and returning upwardly under its own spring action. When the blade 10 has accomplished a cut, the chuck 9d has descended and has forced the arm 50b into the position as indicated by dot-dash lines in Figure 2. Consequently, immediately after the cut has been made, the chuck 9d and arm 50b have assumed their extreme downward position during which period the projection 50a is removed from contact with switch 50 and said switch opens.

As seen in Figure 2A, the switch 50 is closed in accordance with the full-line position shown in Figure 2. However, when switch 50 is opened (as described above) it breaks the circuit shown in Figure 2A. If, by accident, a tube should jostle the switch 6 (see Figure 3), the utilization of a switch 50 in the manner described above will prevent a recurring stroke of the cutter.

After the desired length of tube has been cut or sheared by the knife 10, provision is made for forcibly removing the sheared-off length of tubing in order to release the contact arm 5 and open the switch 6. The knockout arm 12 is provided for this purpose. It is operated by an eccentric 11 mounted on the outer end of shaft 9a, the eccentric 11 carrying a pin 11a (Figure 13). The knockout arm 12 is mounted on block 12a to which is also attached arms 12b, 12b extending angularly with respect to knockout arm 12 and providing a space between the arms 12b within which the eccentric pin 11a moves, so that movement of the eccentric 11 in a counter-clockwise direction will trip the knockout arm 12 moving to the dotted position shown in Figure 13, whereupon the lower end of the knockout arm 12 will forcibly eject the sheared off portion of the tubing T between the cutter block 4 and the contact arm 5. Adjustment of the position of the knockout arm 12 is provided as shown in Figure 14 where the split ring members 12c and 12d carry extensions 12e and 12f respectively held together and about the shaft 9a by means of the bolt 12g, the arm 12f on the split ring 12d being attached to the block 12a. By this means, the bolt 12g may be loosened to fix, in the exact position desired, the knockout arm 12 with respect to the tubing being sheared in order to regulate the movement of the knockout arm 12.

Figure 4:
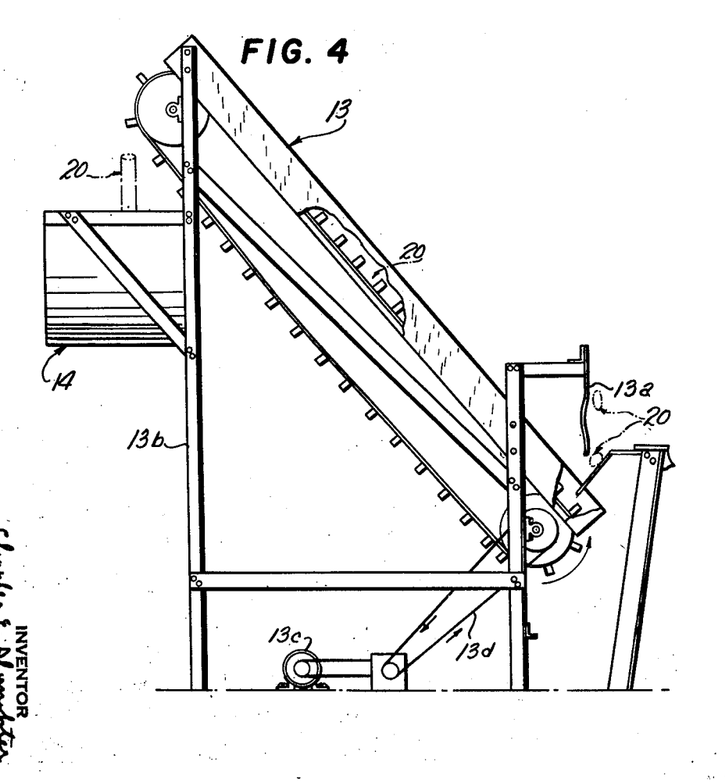
Figures 4 is a side elevation on line 4—4 of Figure 1 showing the conveyor for delivering the sheared tubes to the storage hopper.

As shown in Figure 4, when the sheared tubes are knocked out of position to release the contact arm 5, they may be thrown against a baffle cloth 13a which directs them onto the continuous belt conveyor 13 by which they are conveyed to the hopper 14. The continuous belt 13 and hopper 14 may be mounted on the frame 13b, the continuous belt conveyor 13 being driven by motor 13c and belt 13d. From the hopper 14 the sheared tubes are then fed to the mechanism for sealing an end or stopper in the tube as further described below.

Considering the mechanism as described up to this point, the continuous extruded tubing T is carried through the guide or bridge 2 through the vise 3 which is open at this time to permit the tubing to pass therethrough, then through the cutter block 4 past the knockout arm 12 until the end of the continuous tubing T contacts the contact arm 5. Further movement of the tubing T closes the switch 6 thus operating the solenoids 7 and 8 simultaneously. Operation of the solenoid 7 moves the armature 3h downwardly (Figure 17) and the movable vise member 3c to grip or lock the tubing in the device and prevent further movement of it at this time. At the same time that the tubing is thus locked against further movement, energizing of the solenoid 8 has taken place so that downward movement of the armature 8a (Figure 2) engages the clutch 9 to operate the shearing mechanism so that the knife 10 is moved down into the cutting space in the cutter block 4 to shear off the length of tubing between the cutter block 4 and the contact arm 5. Immediately thereafter and synchronized therewith, the eccentric 11 is operated and its movement causes the eccentric pin 11a to trip the knockout arm 12 (Figure 13), the movement of the knockout arm 12 serving to knock out the sheared position of the tubing. As soon as the sheared-off portion of the tubing has been knocked out of position, the switch 6 is opened thus de-energizing the solenoids 7 and 8. The vise 3 immediately opens permitting the continuous tubing T to advance again while de-energization of the solenoid 8 takes place at the time when the knife 10 has returned to its inoperative position. The tubing T then advances until it contacts the contact arm and the operations are repeated. In this way the desired lengths of container tubes are automatically severed from continuous extruded tubing and made ready for the end sealing operation. The support 5d which carries the contact arm 5 and switch 6, and is mounted on base B, may be made adjustably mounted so that it may be moved to shorten or increase the distance of such contact arm 5 from cutter block 4 in order to control the length of tube which is sheared in order to provide for containers of any desired length.

Figures 5, 18, 19:
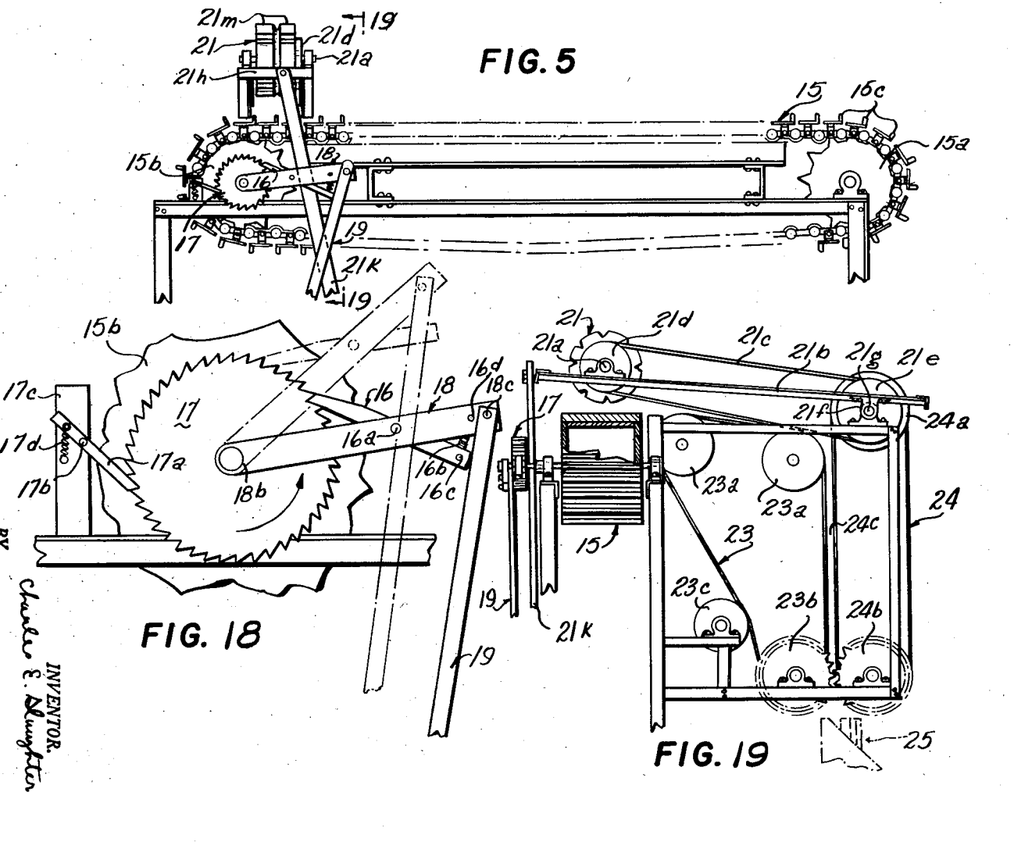
Figure 5 is a side elevation on line 5—5 of Figure 1 showing the conveyor for delivering sheared tubes from the storage hopper to the automatic tube feeding mechanism.
Figure 18 is a fragmentary detail showing the means for controlling movement of the belt conveyor 15.
Figure 19 is a side elevation on line 19—19 of Figure 5 showing the mechanism for removing tubes from the conveyor and delivering them by belts to a chuck at the first station of the sealing machine.

Means are provided for carrying the sheared tubes 20 from hopper 14 to the sealing or end closing station in a directed and controlled manner. In the mechanism shown for this purpose two sheared tubes are sealed simultaneously in the sealing mechanism and thus provided with end closures simultaneously and for this purpose two sheared tubes are delivered from the hopper 14 to the end closing mechanism as follows. The sheared tubes are delivered from the hopper 14 by hand or automatically if desired, onto conveyor belt 15 carried on gears 15a and 15b (Figure 5). The conveyor belt 15 is partitioned by means of cleats 15c into cells loosely accommodating individual sheared tubes. This is done to maintain a certain spaced relationship between tubes corresponding to the spaced relationship of two faces on a pick-off roller hereinafter described. Conveyor belt 15 is given a step by step movement to advance two tubes or any other group of tubes as a unit, into tube delivering position. For this purpose ratchet 16 (Figure 18) is engaged with gear 17 movement of which causes movement of pulley wheel 15b for a distance sufficient to move two sheared tubes under the tube delivering mechanism. Ratchet 16 is pivotally mounted at 16a on the lever 18, one end 18b of which is pivotally mounted on the shaft carrying gear 17 and belt pulley 15b while the other end of lever 18 is pivotally mounted at 18c on the end of the operating arm 19. A spring 16b attached at the outer end 16c of the ratchet 16 has the other end of the spring attached to the lever 18 at 16d in order to maintain the ratchet 16 in engaging position with the teeth of the gear 17. Referring to Figure 18, it will be seen that upward movement of the actuating arm 19 will operate the ratchet 16 to rotate gear 17 and belt pulley 15b the desired distance. To prevent movement of the gear 17 and belt pulley 15b when the ratchet 16 is returning to its normal position, a pawl 17a pivotally mounted at 17b on standard 17c is spring pressed by spring 17d into latching position. Pawl 17a prevents clockwise movement of gear 17 but permits counter-clockwise movement of that gear.

The sheared tubes are removed from the belt conveyor 15 by roller 21 desirably of rubber (see Figures 5, 6, 19, 20, 21). The roller 21 constantly revolves on shaft 21a carried on cradle 21b being driven by belt 21c passing over pulley 21d and 21e. Constantly revolving roller 21 is reciprocated to and away from belt conveyor 15 at timed intervals and when reciprocated toward the belt 15 actually engages the sheared tubes on the conveyor 15 to remove two tubes therefrom. Reciprocation is obtained in the following manner. The roller 21 carried on shaft 21a mounted on the cradle 21b has the cradle 21b mounted at one end on blocks 21f carried on shaft 21g which also carries the pulley 21e. The other end of the cradle has the cross piece 21h to which is pivotally attached arm 21k. Movement of the arm 21k down and up will cause the roller 21 to move toward and away from respectively the conveyor belt 15.

The roller 21 has two tube engaging faces 21m, 21m, spaced apart a distance equal to the position of two tubes on the conveyor belt 15 so that when the roller 21 is reciprocated into contact with the tubes on the conveyor belt 15, rotation of the roller 21 will remove two tubes from the conveyor belt 15 and propel the tubes thus removed from the conveyor belt 15 onto moving belt 23. Belt 23 moves over pulleys 23a, 23a, and geared pulley 23b, and adjustment pulley 23c being provided. As shown in Figure 19, belt 23 moves in a clockwise manner carrying the two sheared tubes delivered thereon by roller 21 toward belt 24. In order to insure alignment of the tubes as delivered to belt 23, partitions 23d (Figure 21) are provided. Where two tubes are being delivered simultaneously, three such partitions 23d are provided supplying channels 23e, one for each sheared tube so that the sheared tubes are carried along by belt 23 between partitions 23d and maintained in their properly aligned position.

Figures 21, 22:
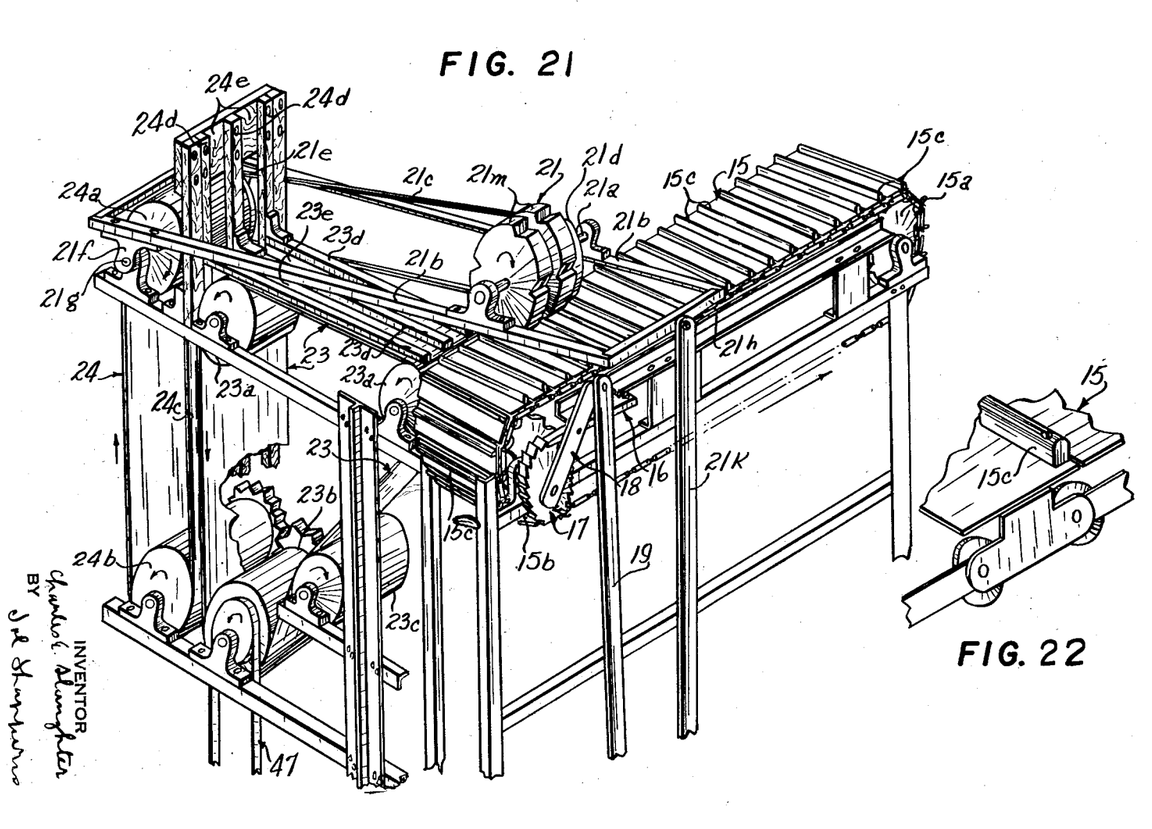
Figure 21 is a perspective view showing the operating mechanism and relation between the belt for conveying tubes from the hopper to the first chuck of the sealing mechanism and the power connections therefor.
Figure 22 is a fragmentary detail of the structure of the conveyor belt shown in Figure 21.

The belt 23 carries such sheared tubes forwardly into contact with vertical moving belt 24 (Figures 19, 21). The belt 24 moves in a counter-clockwise manner on pulley 24a and geared pulley 24b, the latter being geared to pulley 23b. In this way belts 23 and 24 move at the same speed and travel contiguously to each other as shown at 24c. The sheared tubes carried forward by belt 23 are moved into contact with vertically moving belt 24 and are erected or turned through an angle of approximately 90° and moved vertically downward between the contiguous portions of the belts 23 and 24. In order to insure proper alignment of the sheared tubes when carried downwardly between the contiguous portions of the belts 23 and 24, partitions 24d are provided and carried down between the belts 23 and 24 supplying channels 24e within which the sheared tubes move downwardly and are maintained in proper alignment.

Briefly describing the operation of the mechanism which delivers the sheared tubes from the hopper 14 to the end sealing stations, the sheared tubes are fed from hopper 14 onto belt conveyor 15 as by hand and carried forward by the belt conveyor 15 to a position below the rubber roller 21. At timed intervals while the belt 15 is carrying the sheared tubes below roller 21, the latter is reciprocated down into contact with the sheared tubes on belt conveyor 15 and delivers two sheared tubes from the belt 15 onto the belt 23. The belt 23 carries the tubes into contact with vertical belt 24 and moves the tubes into vertical position so that they are carried between contiguous portions of belts 23 and 24 downwardly in aligned position and delivered (Figure 19) to an open chuck 25 of the closure sealing mechanism to be described below. The means for supplying power to the several belts and other operating elements and for timing and correlating the movements of the several parts will be described below.

Figures 6, 20:
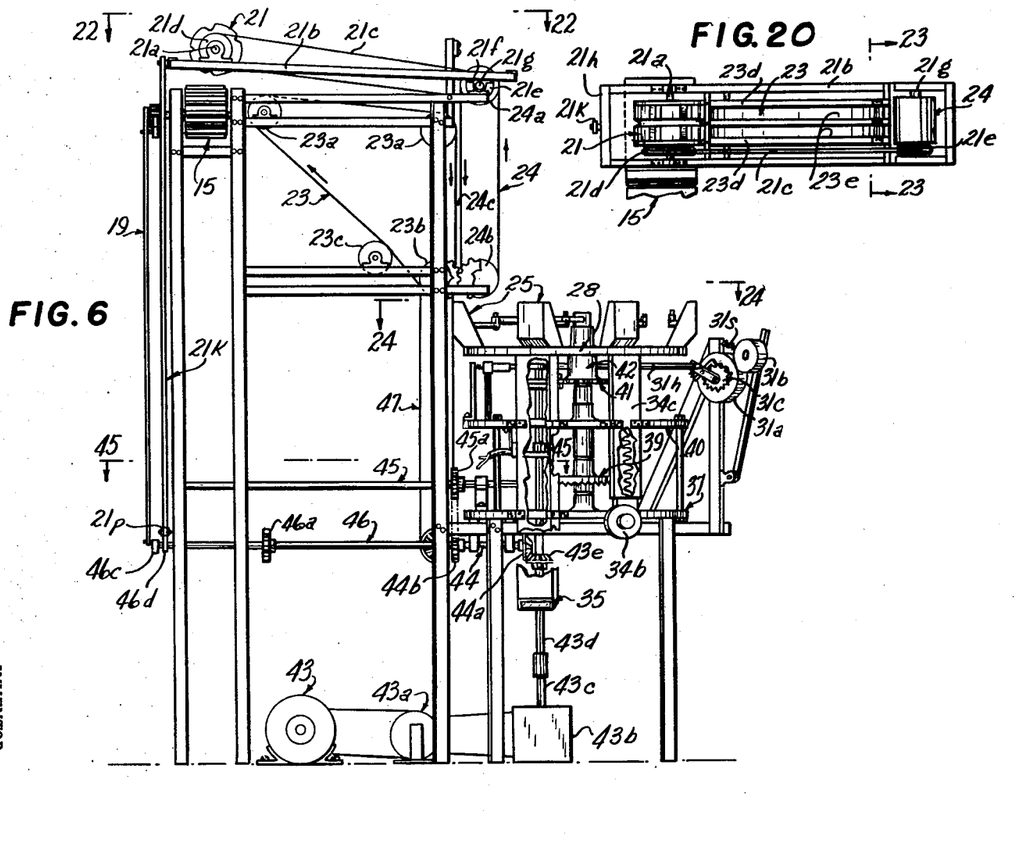
Figure 6 is a side elevation on line 6—6 of Figure 1 showing the sealing machine and related mechanism.
Figure 20 is a top plan view of Figure 19.
Figure 7:
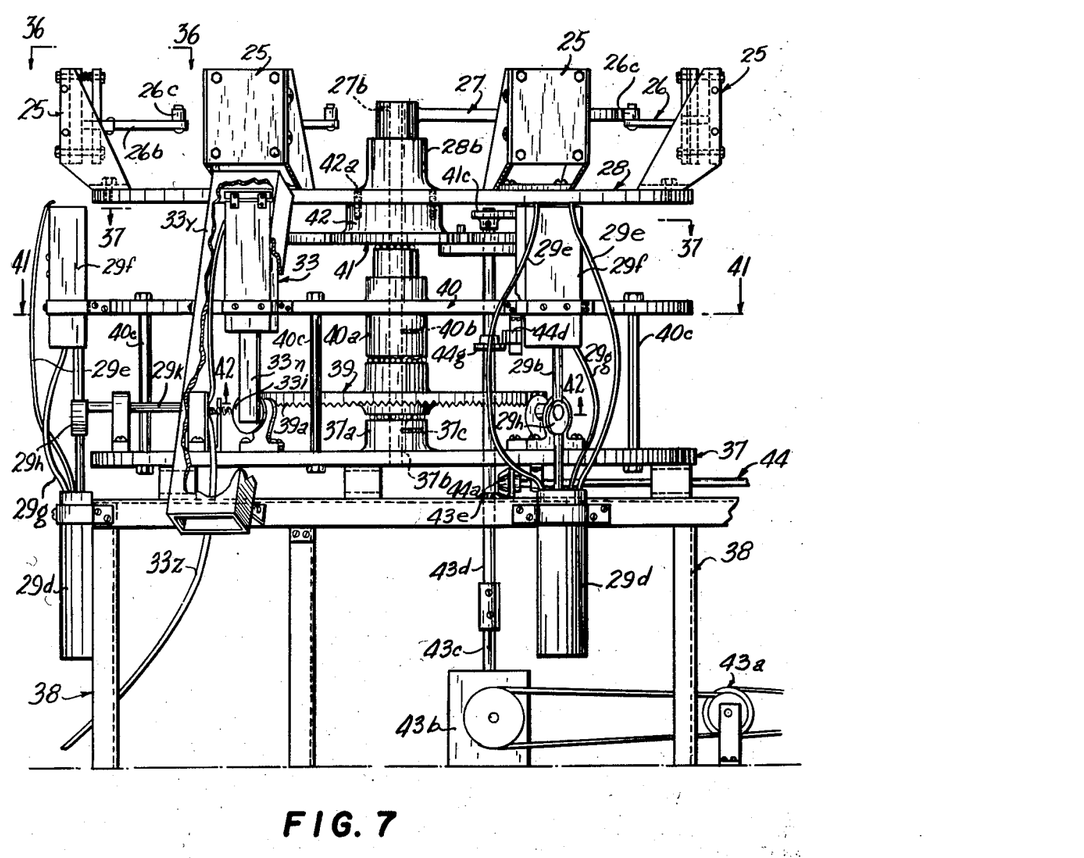
Figure 7 is a side elevation on line 7—7 of Figure 1 showing the sealing and related mechanisms.
Figures 23, 24:
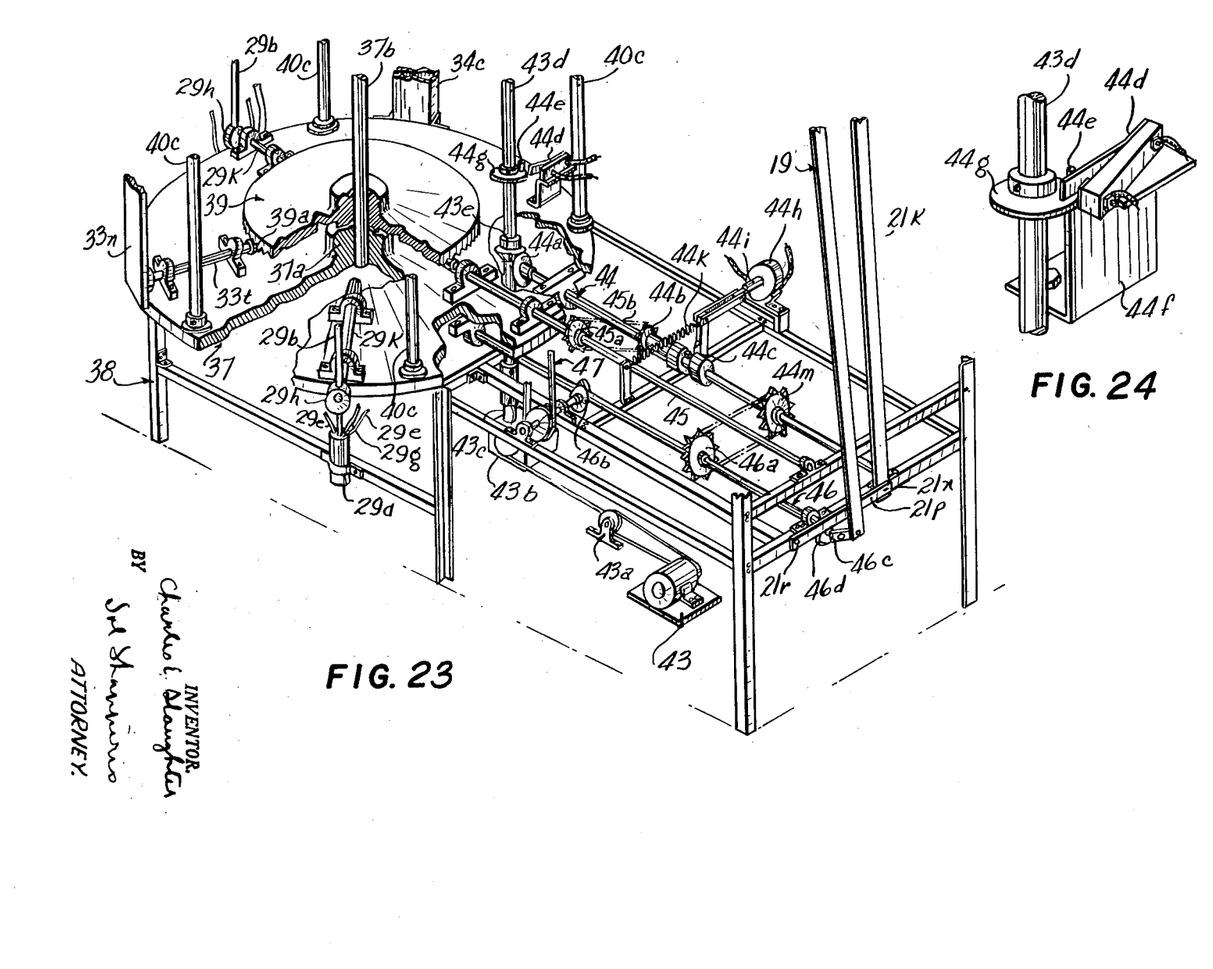
Figure 23 is a perspective view partly in section showing the general means for supplying power to the sealing mechanism.
Figure 24 is a fragmentary detail of the switch control for operating the clutch in connection with power transmission to one of the elements.

The power for operating the entire mechanism for conveying the sheared tubes 20 to the sealing station and the several operations in the sealing mechanism, is all obtained from motor 43 (Figures 6, 7, 23). Referring more particularly to Figures 6 and 23, motor 43 transmits power to the variable speed control 43a and from the latter to the speed reducer 43b from which it is transmitted to shaft 43c, the latter being coupled to the drive shaft 43d having a bevel gear 43e which meshes with bevel gear 44a on shaft 44. Sprocket 44b idles on shaft 44 until connected by clutch 44c to shaft 44. Clutch 44c is activated as follows. A plate 44g keyed to shaft 43d, carries pin 44e which revolves with the shaft 43d. Pin 44e at a portion of its revolution (Figure 24) operates to close switch 44d mounted on bracket 44f carried on base plate 37. The closing of switch 44d operates solenoid 44h which actuates armature 44i to move the clutch 44c. A spring 44k restores the clutch to inoperative position when the switch 44d is opened. The closure of switch 44d and engagement of clutch 44c permits one revolution of sprocket 44b at which time the switch is opened and the clutch disengaged. During the engagement of the clutch 44c, and revolution of sprocket 44b, the latter drives shaft 45 by means of sprocket 45a carried thereon and chain 45b cooperating with the sprockets 44b and 45a.

Shaft 44 carries a second sprocket 44m cooperating with sprocket 46a on shaft 46 to drive the latter and rotate bevel gears 46b which in turn drive belt 47 (Figure 23). Belt 47 (see Figure 21) rotates geared pulley 23b thus controlling and causing movement of belt 23 and through the meshing of geared pulley 23b with geared pulley 24b producing the cooperating movement of belt 24. The upper pulley over which belt 24 moves, is provided with a belt 21c (Figure 6) which rotates roller 21. At the end of shaft 46 a crank 46c (Figure 23) is provided to cause the up and down motion of operating arm 19 which produces the motion for moving conveyor 15 (Figure 21) as explained above. Further, arm 21k (Figure 23) is pivoted at 21n to arm 21p, the other end of which 21r is pivotally mounted on the main frame and contacts cam 46d on shaft 46 to produce the up and down action of the arm 21k and corresponding movement of the cradle 21b (Figure 21) which moves the roller 21 toward and away from the conveyor 15 to discharge sheared tubes 20 therefrom as explained above, thus producing the necessary timed relation in the movement of these various parts.

The correlation of movement of the various mechanisms will be apparent from what has been set forth above but may be briefly explained as follows. The sheared tubes are cut from the continuous tubing by automatic operation and delivered to the conveyor belt 15 from which they are fed periodically by roller 21 to belt 23, the conveyor 15 being operated by a ratchet system in which its movement is synchronized with the movement of the revolving plate 28 of the sealing machine. The sheared tubes thus delivered to belt 23 are automatically transferred and up-ended by belt 24 and delivered into the chucks 25 as the chucks come successively to station 1 on the revolving top plate 28.

Having thus set forth my invention, I claim:

1. Apparatus for conveying a plurality of tubes in transverse alinement comprising a pocket-type conveyor for moving tubes placed thereon in transverse alinement, and a driven overhead discharging means which rotates about an axis that is longitudinally positioned with respect to said conveyor, said discharging means reciprocating about an axis that is parallel to said first named axis to discharge simultaneously at least two tubes from said conveyor.

2. Apparatus as claimed in claim 1 provided with means for imparting step by step movement to said conveyor.

3. Apparatus as claimed in claim 1 in which the tubes discharged from the pocket-type conveyor are received on a second horizontal conveyor and moved by the latter into contact with a vertically moving belt by which the tubes are erected into vertical position for discharge.

4. Apparatus as claimed in claim 1 provided with means for imparting step-by-step movement to said conveyor said discharging means delivering tubes to said conveyor in intervals of non-movement of said conveyor.

5. A method for conveying a plurality of tubes in transverse alinement to an operating station comprising the steps of positioning a plurality of tubes in transverse alinement on a pocket type conveyor, advancing said tubes in step-by-step movement towards said operating station, discharging a pair of tubes by overhead driving means of rotatable form which also reciprocates about an axis parallel to the path of movement of said pocket type conveyor to discharge said tubes to a second conveyor upon which said tubes are moved forwardly toward the operating station and erected into vertical position, and simultaneously discharging said pair of tubes in vertical position to said operating station.

6. A method as claimed in claim 5 wherein a continuous length of tubing is sheared into a plurality of tubes for delivery to the first conveyor prior to positioning the tubes in transverse alinement of said first conveyor.

References Cited in the file of this patent

UNITED STATES PATENTS

| | | |
|---|---|---|
| Re. 20,876 | Molins | Oct. 4, 1938 |
| 1,838,193 | Rundell | Dec. 29, 1931 |
| 1,941,144 | Beardsley et al. | Dec. 26, 1933 |
| 1,944,718 | Rafter | Jan. 23, 1934 |
| 2,115,255 | David et al. | Apr. 26, 1938 |
| 2,383,528 | Winters | Aug. 28, 1945 |
| 2,669,341 | Holstebroe et al. | Feb. 16, 1954 |